E. M. LONG.
DIFFERENTIAL GEARING.
APPLICATION FILED APR. 24, 1915.
1,161,057. Patented Nov. 23, 1915.
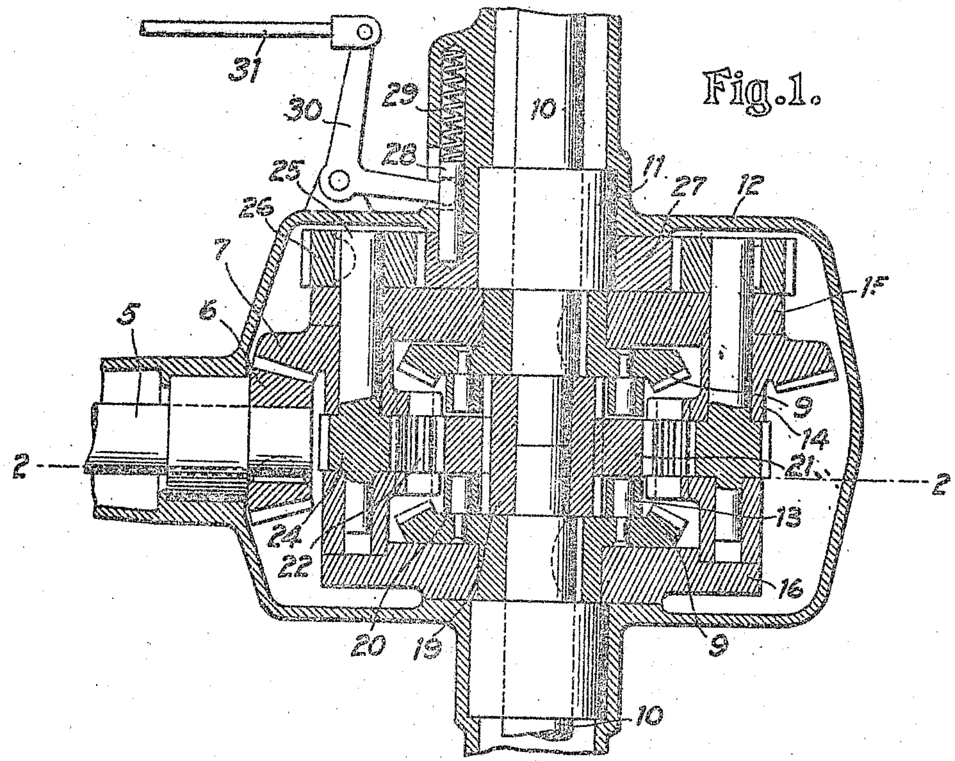
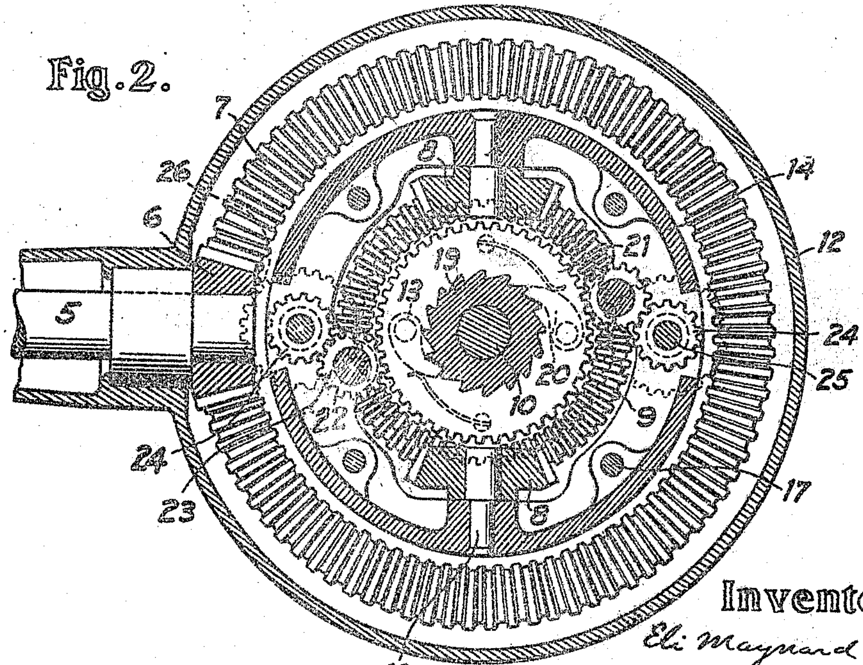
Inventor:
Eli Maynard Long
by Davis & Dorsey
his attorneys

UNITED STATES PATENT OFFICE.

ELI MAYNARD LONG, OF GENEVA, NEW YORK.

DIFFERENTIAL GEARING.

1,161,057. Specification of Letters Patent. Patented Nov. 23, 1915.

Application filed April 24, 1915. Serial No. 23,762.

*To all whom it may concern:*

Be it known that I, ELI MAYNARD LONG, citizen of the United States, and resident of Geneva, in the county of Ontario and State of New York, have invented certain new and useful Improvements in Differential Gearing, of which the following is a specification.

This invention relates to differential gearing such as is employed in self-propelled vehicles to permit either of a pair of driving-wheels to rotate faster than the other when the vehicle is moving in a curved path.

The principal object of the invention is to produce a differential gearing which will normally perform its function in the usual manner, but which will not be subject to the disadvantage, characteristic of the ordinary forms of differential gearing, that in case of the slippage of one of the driving-wheels, owing to loss of tractive friction, the tractive friction of the other wheel is unavailable for the propulsion of the vehicle.

Numerous attempts have been made to accomplish the result set forth, but these have, in general, been characterized either by a certain loss in the efficiency with which the differential gearing normally operates, or by a mode of operation such that the vehicle, when traveling in a curve, is propelled by the inner driving-wheel alone. In the gearing of the present invention, however, both of these disadvantages are avoided by a construction such that normally, and for any amount of differential action within the range normally requisite, the action of the gearing is, or may be, in every respect that of the ordinary differential gearing, whereas in the case of a loss of traction on one of the wheels sufficient to cause it to slip, the excessive differential movement of the wheels which would otherwise occur under these circumstances is prevented automatically, so that the other driving-wheel may always be used for propelling the vehicle with an effectiveness limited only by its own tractive force. These results are accomplished, in the preferred form of the invention, by adding to a differential gearing of any ordinary or suitable form, means which are ineffective during the normal operation of the gearing, but which act automatically to prevent either driving-wheel from rotating at a speed inordinately great in comparison with that of the other driving-wheel, thus preventing the tractive force of the latter from being reduced to that which the slipping wheel would have if freely rotatable.

Another object of the invention is to produce a differential gearing which will, in addition to performing the usual functions of such a gearing, prevent the vehicle in which it is used from running backwardly under the influence of gravity, except when such movement is desired by the operator. The accomplishment of this object is involved in the operation of the mechanism by which the first described object is accomplished.

In the accompanying drawings: Figure 1 is a horizontal axial sectional view of differential gearing embodying the present invention; and Fig. 2 is a vertical sectional view on the line 2—2 in Fig. 1.

The invention is illustrated as embodied in differential gearing of the rear-axle type, in which a drive-shaft 5, extending from the source of power by which the vehicle is driven, is connected, by a bevel-pinion 6, with a bevel-gear 7, this gear, in turn, being connected, by beveled planetary pinions 8, with bevel-gears 9 on the adjacent ends of the shafts or axles 10 extending to the driving-wheels of the vehicle, all as is usual in such constructions. The axles 10 are also shown as mounted in bearings 11 fixed in a gear-casing 12, in the usual manner.

The gear 7 is integral with a ring 14 which is clamped between the peripheries of two disks 15 and 16, these three parts being connected together by through-bolts 17 and thus forming a unitary rotary member having bearings, at the centers of the disks, upon the hubs of the gears 9. The planetary pinions 8 are mounted on studs 18 fixed in the ring 14.

The means, in which the present invention particularly resides, for preventing either of the axles 10 from being rotated at a speed which is excessively great in comparison with that of the other axle, will now be described. Journaled upon the reduced inner ends of the axles 10 is a sleeve 19 having ratchet-teeth cut upon it from end to end. This ratchet-sleeve coöperates with spring-pressed pawls 20, of which a pair are pivoted on studs 13 projecting from the inner face of each of the gears 9. A gear-wheel 21 is mounted upon the middle of the ratchet-sleeve 19, having an opening conforming to the teeth of the ratchet-sleeve to fix these parts against relative rotation. The gear 21 meshes with two pinions 22, each of which is loosely mounted on a stud 23 fixed in inwardly projecting lugs on the ring 14. Each pinion 22 meshes with a pinion 24 formed integrally on the inner end of a shaft 25. The shafts are journaled in the ring 14, and project through openings in the disk 15, as shown in Fig. 1. On the outer end of each shaft 25 a pinion 26 is keyed, and these pinions mesh with a gear 27 which is journaled on the inner end of the bearing 11.

The gear 27 is normally fixed against rotation, and consequently, as the ring 14 rotates in the normal direction of drive, rotation is imparted, through the pinion 26 and the shaft 25, to the pinions 24 and 23 and thence to the gear 21, and the ratios of the several gear pairs are such that the gear 21 is driven in the same direction of rotation as the ring 14, but at a speed about 25 per cent. higher.

With the parts in operation as just described, assuming that the driving-wheels are both rotated at the same speed, the ratchet-sleeve 19 will be constantly overrunning the pawls 20. If now the vehicle moves in a curved path, one of the driving-wheels will rotate faster than the other: even so, within the ordinary limits of operation of the differential gearing, no modification in its action will occur, as the one of the gears 9 which is rotated faster than the other will not rotate as fast as the gear 21 and the ratchet-sleeve 19. If, however, one of the wheels, whether the vehicle be moving straight ahead or on a curved path, should lose traction sufficiently to slip, and thus tend to rotate much faster than the other wheel, the pawls 20 connected with the gear 9 by which the slipping wheel is driven, will overtake the ratchet-sleeve and will act to prevent the gear in question from rotating any faster than this sleeve. Owing to this action the other driving-wheel may be driven with a force such as to take full advantage of its tractive effect, notwithstanding the slipping of the first driving-wheel.

In case the vehicle be moving upwardly on a hill, and the driving-shaft 5 be disconnected from the engine, as by the usual driving-clutch, it is necessary, in the case of an ordinary differential gearing, to apply the brakes at once, or the vehicle will run backwardly down hill under the influence of gravity. With a gearing of the present construction, however, this is impossible, for the effect of such backward movement in the axles 10, being communicated to the disks 15 and 16 and the ring 14, tends to cause the ratchet-sleeve 19 to be rotated backwardly at a higher speed than that of the gears 9. The pawls 20, however, prevent such rotation of the ratchet-sleeve, and thus the gearing is locked against reverse movement.

When it is desired to drive the vehicle backwardly the parts of the gearing peculiar to the present invention must be thrown out of operation, and for this purpose provision is made for unlocking the gear 27 so as to permit it to rotate freely. This gear has a socket which is normally engaged, as shown in Fig. 1, by a locking-bolt 28 slidingly mounted in the casing 12. A spring 29 holds the bolt normally in engagement with the gear, but by means of a bell-crank lever 30 the bolt may be withdrawn when necessary. The lever 30 is connected, by a rod 31, with any suitable manually-operable device (not shown) for the purpose in question. It may most conveniently be connected with the lever by which the reverse-gearing of the vehicle is thrown into operation.

While the means for preventing an unduly high rotative speed of either of the driving-wheels are preferably in the form of positive gear-connections as shown and described, the invention is not limited to embodiment in this form. The ratchet-sleeve 19 and the pawls 20 constitute, in effect, two overrunning clutches, and it will be apparent that overrunning clutches of other well-known forms may be substituted therefor; and, in general, it will be apparent that the invention is not limited to the embodiment thereof hereinbefore described and illustrated in the accompanying drawings, but may be embodied in various other forms within the nature of the invention as it is defined in the following claims.

I claim:—

1. In a differential gearing, the combination, with the driving-gear, the driven gears, and the differential connections between them; of means rotatable coaxially with the driven gears; overrunning clutches connecting the driven gears with said rotatable means; and retarding means for preventing free rotation of said rotatable means.

2. In a differential gearing, the combination, with the driving-gear, the driven gears, and the differential connections between them; of means rotatable coaxially with the driven gears; overrunning clutches connecting the driven gears with said rotatable means; and retarding means for limiting the rotation of said rotatable means to a speed somewhat greater than that of the driving-gear.

3. In a differential gearing, the combination, with the driving-gear, the driven gears, and the differential connections between them; of means rotatable coaxially with the driven gears; overrunning clutches connecting the driven gears with said rotatable means; and gear-connections, between said rotatable means and the driving-gear, arranged to permit a rotation of said means somewhat faster than the rotation of the driving-gear.

4. In a differential gearing, the combination, with the driving-gear, the driven gears, and the differential connections between them, of means, operable only in a forward direction of rotation, for preventing free relative rotation of the driven gears.

5. In a differential gearing, the combination, with the driving-gear, the driven gears, and the differential connections between them, of means rotatable coaxially with the driven gears; overrunning clutches connecting the driven gears with said rotatable means; gear-connections, between said rotatable means and the driving-gear, arranged to limit said means to a rotation somewhat faster than the rotation of the driving-gear; and means for rendering said gear-connections inoperative at will.

6. In a differential gearing, the combination, with the driving-gear, the driven gears, and the differential connections between them, of means for positively limiting each driven gear to a speed of rotation somewhat greater than that of the driving-gear.

7. In a differential gearing, the combination, with the driving-gear, the driven gears, and the differential connections between them, of means rotatable coaxially with the driven gears; overrunning clutches connecting the driven gears with said rotatable means; and gear-connections, between said rotatable means and the driving-gear, arranged to drive said means positively in either direction of operation at a speed somewhat faster than the rotation of the driving-gear.

8. In a differential gearing, the combination, with the driving-gear, the driven gears, and the differential connections between them, of a rotatable member coaxial with the driven gears and located between them; an overrunning clutch connecting each driven gear with said rotatable member; gearing for driving said rotatable member always in the same direction of rotation as the driving gear, but at a somewhat greater speed; and means for rendering said gearing inoperative at will to release the rotatable member.

ELI MAYNARD LONG.